April 8, 1969  T. EVANS  3,437,209
CONTINUOUS CENTRIFUGAL FILTER CONSTRUCTION
Filed Feb. 1, 1967  Sheet 1 of 2

INVENTOR.
THOMAS EVANS, DECEASED
BY MRS. RALPH H. L. BECKER,
ADMINISTRATRIX

BY Learman, Learman & McCulloch

United States Patent Office 3,437,209
Patented Apr. 8, 1969

3,437,209
CONTINUOUS CENTRIFUGAL FILTER CONSTRUCTION
Thomas Evans, deceased, late of Westerly, R.I., by Mrs. Ralph H. L. Becker, executrix, Westerly, R.I., assignor to Baker Perkins, Inc., Saginaw, Mich., a corporation of New York
Filed Feb. 1, 1967, Ser. No. 613,963
Int. Cl. B01d 33/06
U.S. Cl. 210—374         18 Claims

ABSTRACT OF THE DISCLOSURE

A continuously operable centrifugal filter for separating liquids and solids having an imperforate bowl nested within an outer, relatively rotatable, perforate bowl, and scrolls in scraping relation with the interior walls of the bowls for scraping solids therefrom in opposite directions to discharge solids from the inner bowl to the outer bowl, and including means for directing wash liquid onto the solids as they are discharged to the outer bowl.

*Field of the invention*

This invention relates to centrifugal filter apparatus and more particularly to a continuously operable centrifugal filter for separating solids from liquids.

*Summary of the invention*

Liquor containing liquids and solids is delivered into an inner, rotating, conical bowl. Solids in the bowl are carried vertically by a tapered scroll in scraping relation with the inner surface of the bowl and the liquid flows out of the bowl through one or more discharge ports. At the upper end of the bowl is a screen over which the solids pass for centrifugal discharge to an outer, rotating, perforate bowl. Wash liquid is sprayed on the solids as they pass over the screen. Washed solids are conveyed downwardly along the outer bowl by a scroll in scraping relation with the perforate wall thereof and are discharged from the outer bowl for collection. Wash liquid and residual moisture clinging to the washed solids are discharged centrifugally through the perforate wall of the outer bowl.

An object of the invention is to provide a centrifugal filter construction which is capable of truly continuous operation in that a slurry may be introduced uninterruptedly to the apparatus and the filtrate and clarified liquid may be discharged uninterruptedly from the apparatus.

Another object of the invention is to provide centrifugal filter apparatus having means for effecting washing of the filtrate and wherein the wash liquid may be effectively separated from the mother liquor.

A further obpect of the invention is to provide filter apparatus of the character described and wherein the crystals or filtrate may be accelerated gradually, rather than suddenly, thereby minimizing damaging of the crystals.

A further object of the invention is to provide centrifugal filter apparatus wherein the solids or crystals discharged from the apparatus have substantially the same degree of dryness.

Another object of the invention is to provide centrifugal filter apparatus of the character described which is mechanically considerably simpler in construction and operation than centrifugal filters in use heretofore for substantially the same purposes.

Figure 1:
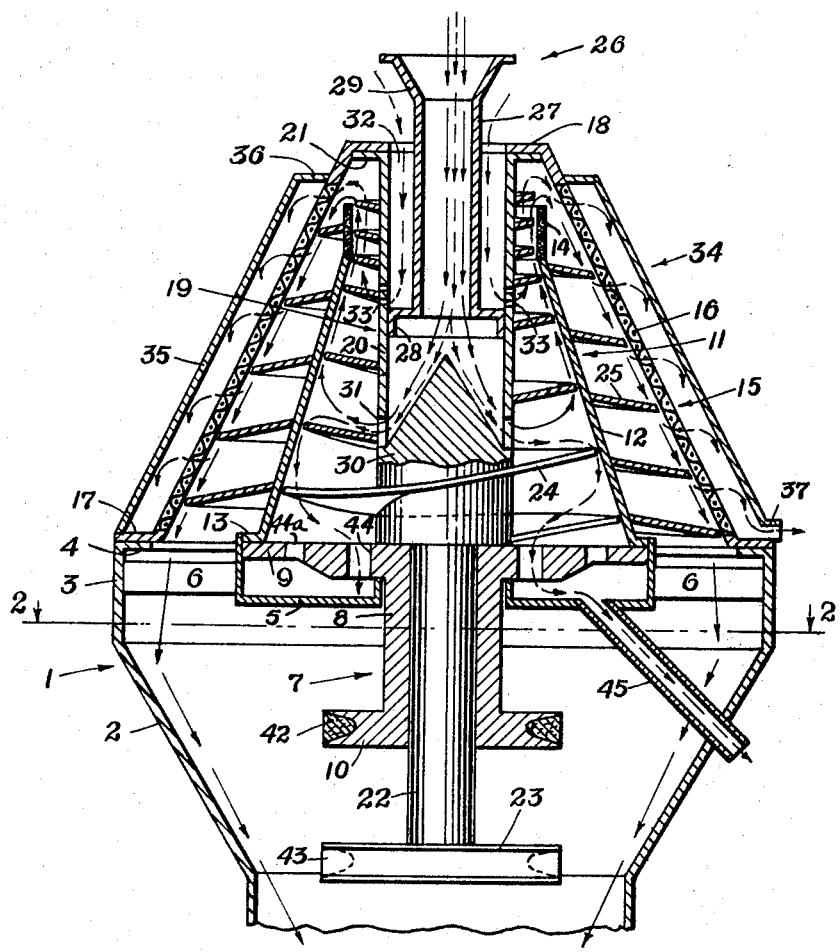
Figure 2:
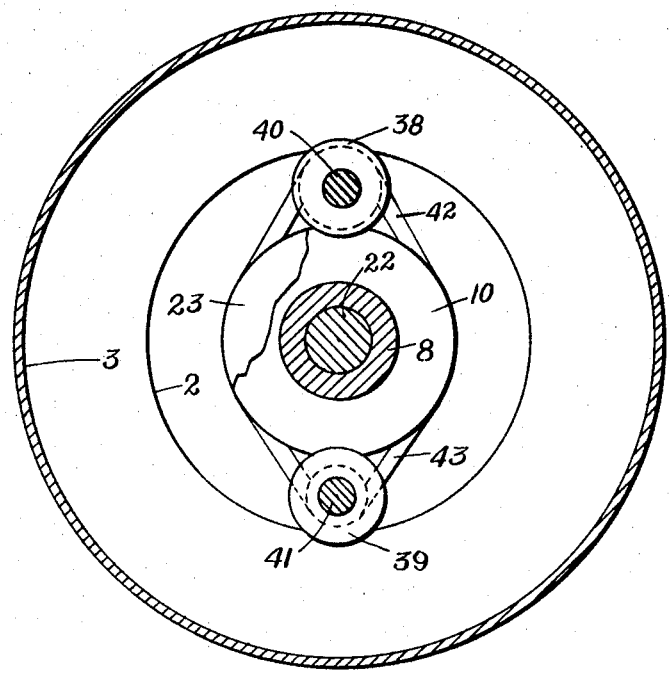

Other objects and advantages of the invention will be pointed out specifically or will become apparent from the following description when it is considered in conjunction with the appended claims and the accompanying drawings, in which:

FIGURE 1 is a vertical sectional view of apparatus constructed in accordance with the invention; and FIGURE 2 is a sectional view taken on the line 2—2 of FIGURE 1.

Apparatus constructed in accordance with the invention comprises a centrifugal machine designated generally by the reference character 1 and which preferably includes a substantially frustoconical hopper portion 2 terminating at its upper end in a cylindrical portion 3 to which is joined an inwardly turned load bearing flange 4. Concentric with the cylindrical portion 3 is an inner, open top housing 5 which is supported on the main frame by suitable brace members 6.

Rotatably journaled in the member 5 is a spool 7 having a hollow shank 8 at one end of which is an annular flange 9 that is received in and forms a cover for the housing member 5. At its opposite end the shank 8 is provided with a V-groove pulley 10.

Welded or otherwise suitably secured to the flange 9 for rotation therewith is a first or radially inner, substantially frustoconical bowl member 11 having a truncated stantially frustoconical bowl member 11 having a truncated, imperforate wall 12 terminating at one end in a flange 13 which may be welded or otherwise suitably fixed to the flange 9. Secured to the opposite end of the wall 12 is a cylindrical screen 14.

Radially outwardly of the bowl member 11 is a second bowl member 15 in which the member 11 nests. The bowl member 15 includes a frustoconical, perforated screen portion 16 which terminates at its lower end in a bearing flange 17 which rotatably bears against the frame flange 4 or is provided with suitable seals or labyrinths. At its upper end the perforated wall 16 terminates in an imperforate annular mounting member 18. The arrangement of the members 11 and 15 is such that the lesser diameter ends thereof are adjacent one another and the greater diameter ends are adjacent one another.

A first scroll member 19 is carried by the outer bowl member 15 and comprises a hollow, cylindrical shaft 20 having a peripheral flange 21 at its upper end which is welded or otherwise suitably fixed to the mounting member 18. At its opposite end the shaft 20 is secured to a shaft 22 that is journaled for rotation in the spool 7 and carries at its lower end a V-groove pulley 23. To the external surface of the shaft 20 is secured a helical vane 24 of such diameter as to be in scraping relation with the inner surfaces of the bowl member 11 and the screen member 14.

A second helical scroll vane 25 is secured to the external surface of the bowl member 11 and to the screen member 14, the diameter of the vane 25 being such that it is in scraping relation with the interior surface of the screen wall 16. As is apparent from FIGURE 1, the pitch of the vane 24 is opposite that of the vane 25. That is, if the vane 24 be considered a right-hand pitch, the pitch of the vane 25 is left-hand.

Means 26 is provided for introducing a slurry to the interior of the bowl 11 adjacent the lower end of the latter and comprises a tubular member 27 which extends into the shaft 20 and terminates at its lower end in a mounting flange 28 that is fixed to the inner surface of the shaft 20. At its upper end, the tube 27 is provided with a mouth 29 into which a slurry containing mother liquor and solids may be introduced. Beneath the tube 27 and secured within the shaft 20 is a conical distributor 30 which directs slurry radially outwardly into the interior of the bowl member 11 through ports 31 formed in the shaft 20.

The diameter of the tube 27 is less than the diameter of the shaft 20 so as to provide an annular space 32 between the members 20 and 27. The space 32 is adapted to receive wash liquid and communicates with the interior of the bowl member 11 adjacent the screen 14 and remote from the ports 31 by means of openings 33 provided in the shaft 20.

Surrounding the outer bowl member 15 is a frustoconical shield 34 having an imperforate wall 35 which spans the axial length of the screen wall 16 and which is secured at its lower end to the flange 17. At its upper end, the wall 35 is provided with a flange 36 that is secured to the mounting member 18. At least one opening 37 is provided at the lower end of the shield 34 through which liquid may be discharged.

Means for driving the bowl members 11 and 15 comprises a pair of electric motors 38 and 39 suspended from the frame member 5 by supports 40 and 41, respectively. The motor 38 drives a belt 42 that is trained around the pulley 10 and the motor 39 drives a belt 43 that is trained around the pulley 23. In the disclosed embodiment, the pulley 10, the bowl member 11 and the second scroll vane 25 are driven clockwise by the motor 38, and the pulley 23, the outer bowl 15 and the first scroll vane 24 also are rotated clockwise by the motor 39. The speeds of the motors 38 and 39 are unequal, however, so as to provide for relative rotation between the bowl members 11 and 15 and their respective scrolls for a purpose presently to be explained.

In the operation of the apparatus, a slurry of mother liquor and solids is introduced to the inlet tube 27 whence it is discharged by centrifugal force via the openings 31 to the interior of the rotating bowl member 11. The rotation of the inner bowl will cause the slurry to be acted upon by centrifugal force so that the more dense solid material or crystals will be deposited on the inner surface of the imperforate wall 12 and the liquid will occupy a radially inner position. Due to the relative rotation of the bowl members 11 and 15, the scroll vane 24 will rotate relatively to the member 11 so as to cause crystals deposited on the wall 12 to be conveyed upwardly toward the screen member 14. Meanwhile, clarified liquid will settle to the bottom of the member 15 whence it may pass via ports 44 or 44a to the interior of the housing 5 for discharge through a discharge drainage tube 45. Plugs may be inserted in either of the ports 44 or 44a to use one set of ports or the other, depending on the depth of liquor desired.

As the crystals are conveyed upwardly of the inner bowl member 11 toward the screen 14, wash liquid may be introduced to the annular space 32 for discharge via the ports 33 so as to wash the crystals adjacent the upper end of the inner bowl. By the time the crystals are washed, they will have emerged from the mother liquor, thereby enabling an effective washing operation to be achieved. Most of the wash liquid will be discharged through the drainage tube 45 with the clarified mother liquor.

Crystals emerging from the upper end of the inner bowl 11 will be flung centrifugally against the perforated wall 16 of the outer bowl member 15 and will be scraped downwardly along the latter by the scroll vane 25. Liquid clinging to the crystals will be discharged centrifugally through the wall 16 for drainage via the opening 37. The dried crystals will be discharged to the upper bottom tube whence they will fall by gravity to a suitable collection apparatus (not shown).

The disclosed embodiment is representative of a presently preferred form of the invention but is intended to be illustrative rather than definitive thereof. The invention is defined in the claims.

What is claimed is:

1. A centrifugal filter construction for a slurry comprising light and heavy components comprising: generally vertically disposed radially inner and outer bowl members; means for introducing a slurry to the interior of said inner bowl member; means mounting said bowl members for rotation about a generally vertical axis; first scroll means carried by said outer bowl member in scraping relation with the interior of said inner bowl member and helically pitched to move material upwardly; second scroll means carried by said inner bowl member in scraping relation with the interior of said outer bowl member and helically pitched to move material downwardly; means communicating with the lower end of said inner bowl member for receiving light components therefrom; means communicating with the lower end of the outer bowl member for receiving heavy components therefrom; and means for rotating said bowl members relatively to one another.

2. The construction set forth in claim 1 wherein said inner and outer bowl members are substantially frustoconical.

3. The construction set forth in claim 2 wherein said bowl members are so arranged that the inner bowl member nests within the outer bowl member with the lesser diameter ends of said bowl members adjacent one another.

4. The construction set forth in claim 1 including means communicating with the interior of said inner bowl member for introducing wash liquid thereto above the means for introducing the slurry.

5. The construction set forth in claim 1 wherein said inner bowl member is imperforate for most of its length and said outer bowl member is perforate.

6. The construction set forth in claim 5 including shield means surrounding said outer bowl member for collecting liquid filtered through said outer bowl member.

7. A centrifugal filter construction comprising an inner, substantially frustoconical bowl member; an outer, substantially frustoconical bowl member in nested relation with said inner bowl member; means mounting said bowl members for relative rotation about a common axis; means communicating with the interior of said inner bowl member for introducing a slurry comprising heavy and light components thereto during rotation of said inner bowl member; first scroll means carried by said outer bowl member and in scraping relation with the interior of said inner bowl member, the pitch of said first scroll means being such that heavy components deposited on said inner bowl member by centrifugal force may be conveyed to the lesser diameter end of said inner member for discharge to the lesser diameter of said bowl member; means for receiving light components from the interior of said inner bowl member; second scroll means carried by said inner bowl member and in scraping relation with the interior of said outer bowl member, the pitch of said second scroll means being such that heavy components discharged to and deposited on said outer bowl member by centrifugal force may be conveyed to the larger diameter end of said outer bowl member for discharge; means for receiving heavy components therefrom; and means for rotating said inner and outer bowl members relatively to one another.

8. The construction set forth in claim 7 wherein said bowl members are rotated continuously in the same direction but at different speeds.

9. The construction set forth in claim 7 including screen means carried by one of said bowl members in the path of solids discharged to said outer bowl member, and means adjacent said screen means for delivering wash liquid thereto.

10. The construction set forth in claim 9 wherein said inner bowl member is imperforate for most of its length and said outer bowl member is perforate.

11. The construction set forth in claim 10 including shield means surrounding said outer bowl member for collecting light components discharged therethrough.

12. A centrifugal filter apparatus comprising: generally concentric, radially inner and outer bowl members; means for introducing a slurry comprising light and heavy components to the interior of said inner bowl member; means mounting said bowl members for relative rotation;

said inner bowl member being imperforate through most of its length and said outer bowl member being perforate through most of its length; scraper means carrying heavy components in said inner bowl member toward one end thereof to discharge them to said outer bowl member; means for removing light components from said inner bowl member; means for removing heavy components from said outer bowl members; and means for collecting components filtered through said outer bowl member.

13. The combination defined in claim 12 in which said bowl members are each mounted for rotation about a generally vertical axis and said scraper means is pitched to move said heavy components upwardly.

14. A centrifugal filter apparatus comprising: generally concentric, generally vertically disposed, radially inner and outer bowl means, each mounted for rotation about a generally vertical axis; means for introducing a slurry comprising light and heavy components to the interior of said inner bowl means; means mounting said inner and outer bowl means for relative rotation; scraper means carrying heavy components in said inner bowl means upwardly and discharging them to said outer bowl means; means for removing light components from said inner bowl means; and means for removing heavy components from said outer bowl means.

15. The combination defined in claim 14 in which wash liquid inlet means communicates with said inner bowl means above said means for introducing the slurry.

16. The combination defined in claim 15 in which said inner bowl means is imperforate for most of its length but has a perforate section extending generally vertically just above said wash liquid inlet means.

17. A centrifugal filter apparatus comprising: generally concentric, radially inner and outer bowl members; means mounting both bowl members for rotation; one of said bowl members being imperforate through most of its length and the other of said bowl members being perforate through most of its length; means for introducing a slurry comprising light and heavy components to the interior of said imperforate bowl member; conveyor means for carrying heavy components in said imperforate bowl member toward one end thereof and discharging them to said perforate bowrl member; means for receiving light components from substantially the opposite end of said imperforate bowl member; means for receiving heavy components from said perforate bowl member; and means for receiving components filtered through said perforate bowl member.

18. The combination defined in claim 17 in which said bowl members are each mounted for rotation about a vertical axis; and said perforate bowl member supports said conveyor means which rotates with said perforate bowl member.

References Cited
UNITED STATES PATENTS 2,511,585   6/1950   Howe _____ 233—2

FOREIGN PATENTS 1,167   11/1903   Denmark.

REUBEN FRIEDMAN, *Primary Examiner.*

J. L. DECESARE, *Assistant Examiner.*

U.S. Cl. X.R.

210—377, 380; 233—2